Sept. 29, 1970        R. L. AAGARD        3,531,183
LIGHT BEAM DEFLECTOR
Filed Oct. 30, 1967        2 Sheets-Sheet 1
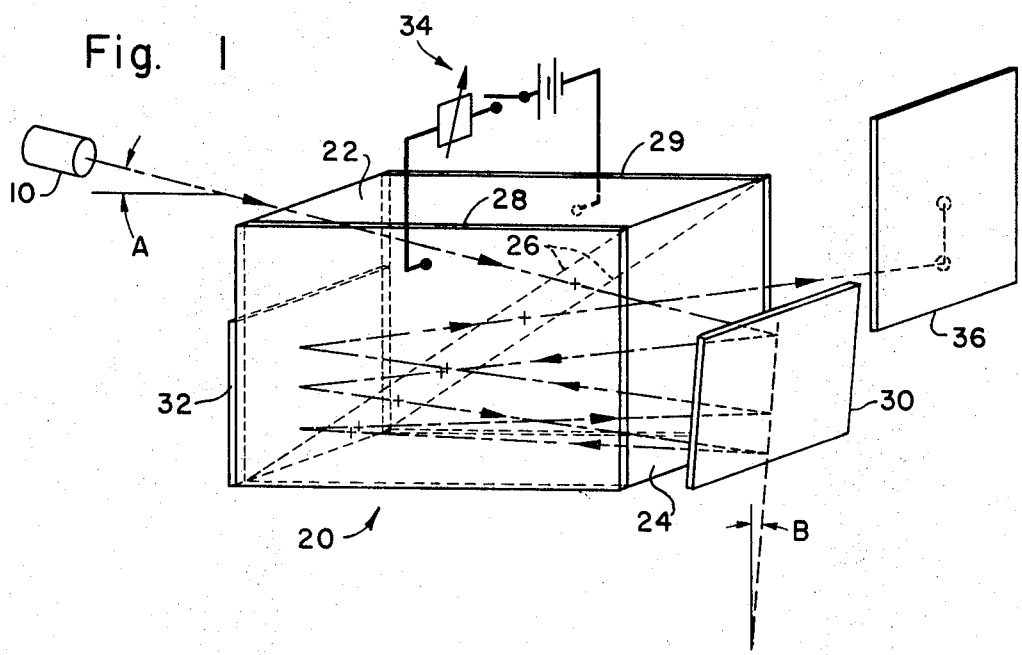
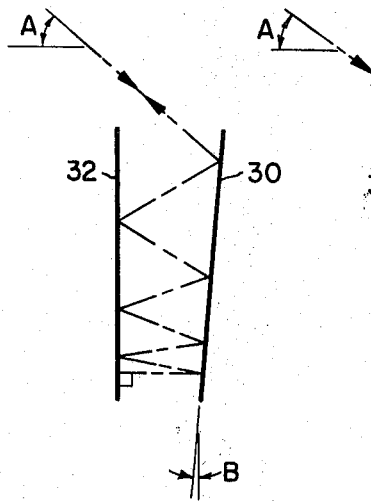 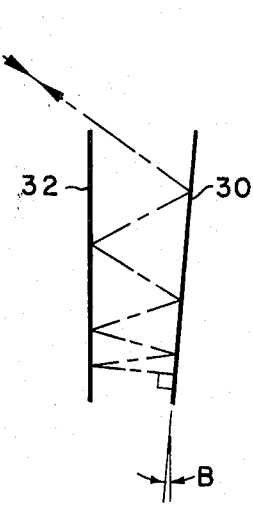 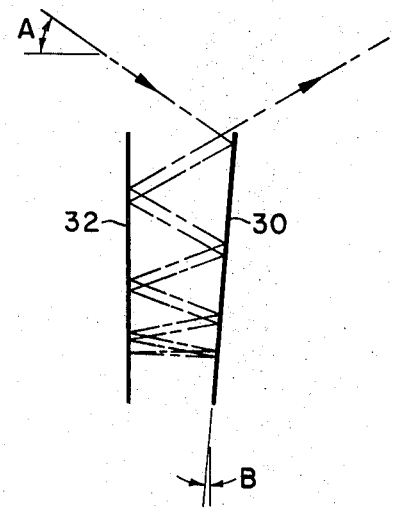
*INVENTOR.*
ROGER L. AAGARD
BY
ATTORNEY.

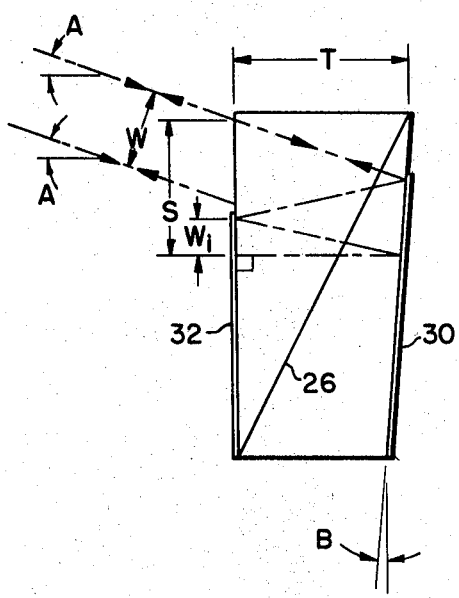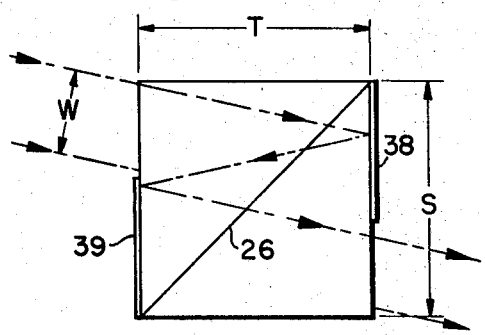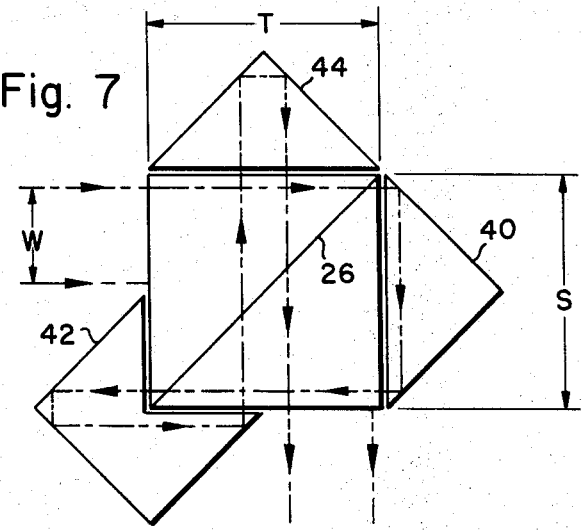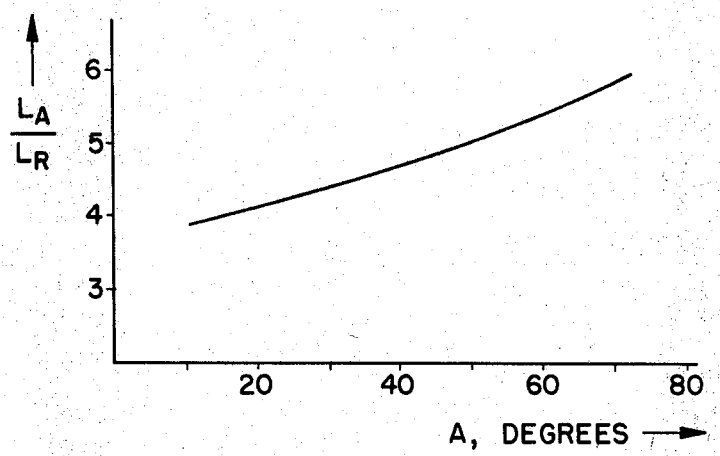
INVENTOR.
ROGER L. AAGARD
ATTORNEY.

United States Patent Office 3,531,183
Patented Sept. 29, 1970

3,531,183
LIGHT BEAM DEFLECTOR
Roger L. Aagard, Minneapolis, Minn., assignor to Honeywell Inc., Minneapolis, Minn., a corporation of Delaware
Filed Oct. 30, 1967, Ser. No. 678,858
Int. Cl. G02f *1/28*
U.S. Cl. 350—160                                    5 Claims

ABSTRACT OF THE DISCLOSURE

A light beam deflector wherein the electro-optic deflecting medium is enclosed between two oppositely disposed non-parallel reflective surfaces for reflecting the light beam back and forth through the deflecting medium. The non-parallel configuration causes the reflecting beam to follow a descending and then ascending path through the deflecting medium whereby increased cumulative deflection is obtained.

BACKGROUND OF THE INVENTION

This invention relates to light deflectors using optically transparent electro-optic media. Electro-optic light deflectors are known generally in the art wherein light beams are deflected by changes in the optical properties of the deflecting medium through which the light is passed. Crystalline, liquid and gaseous media have been used in a variety of light deflectors.

This invention is particularly concerned with those light beam deflectors wherein cumulative deflection of the beam is achieved by passing the beam back and forth through the deflecting medium a plurality of times to accumulate the magnitude of the deflection. Although this invention is useful in connection with any deflecting medium wherein cumulative deflection may be obtained, it will be particularly described in connection with an electro-optic crystal medium of the type described in U.S. Pat. 3,295,912, which issued to Harold Fleisher et al. on Jan. 3, 1967.

SUMMARY OF THE INVENTION

It is a general object of the invention to provide increased cumulative deflection in deflectors of the type wherein a light beam undergoes multiple passes through a light deflecting medium to accumulate deflection. This object is achieved by providing a pair of non-parallel reflective means oppositely disposed with respect to the light deflecting medium whereby light entering the deflecting medium is reflected back and forth between the reflective means and through the deflecting medium a plurality of times along a path which progresses downwardly through the medium and then ascends upwardly through the medium thereby accumulating the deflection of the beam. A variable magnetic or electric field is applied to the deflecting medium in an amount proportional to the deflection of the light beam desired.

BRIEF DESCRIPTION OF THE DRAWING

FIG. 1 is a schematic illustration of a preferred embodiment of the light deflector according to the invention;

FIGS. 2, 3 and 4 show various arrangements for non-parallel reflective surfaces which reflect the light beam back and forth through the deflecting medium to accumulate deflection in accordance with this invention;

FIG. 5 is a schematic showing of a deflecting medium wherein the reflective surfaces are in the form of coatings on the sides of the deflecting medium;

FIGS. 6 and 7 show typical prior art arrangements for the reflective surfaces used to reflect a light beam back and forth through the deflecting medium, and FIG. 8 is a graphical representation showing the improvement or gain in deflection provided by the present invention as compared to prior art deflectors of this general type.

DESCRIPTION OF THE PREFERRED EMBODIMENTS

Referring now to FIG. 1, a monochromatic light source 10 is shown, which is for example a continuous wave (CW) laser, generating polarized light. The portion of the light beam passing through the deflector 20 is represented simply by a dashed line. In this embodiment, the electro-optic light deflector 20 is essentially the same as that disclosed in the above mentioned Fleisher et al. patent and includes a light transparent body having two distinct electro-optic media 22 and 24 with boundary area 26 between the media. These media, which are preferably crystalline, have the characteristic that their refractive indices change in opposite directions with the application of an electric field. Typical materials displaying this electro-optic effect are for example potassium dihydrogen phosphate, potassium dideuterium phosphate, ammonium dihydrogen phosphate and barium titanate. The crystals may be approximately equal size and cemented together to form, for example, a rectangular body as shown. Of course, this invention may also make use of other types and shapes of deflecting media wherein multiple passage of a light beam therethrough will accumulate deflection.

As described in detail in the Fleisher et al. patent, a light beam entering deflector 20 may be deflected when crossing boundary 26 by impressing an electric field normal to the path of the light beam through the deflector. The electric field is applied to the transparent body composed of electro-optic media 22 and 24 by means of a pair of electrodes 28 and 29 disposed on opposite sides of the transparent body. The types of materials utilized for these electrodes and the manner of applying them to the surfaces of the transparent body are well known and will not be described in detail herein.

Reflective means such as reflective surfaces 30 and 32 are disposed to other opposite sides of the transparent body to intercept and deflect the light beam through the transparent body a plurality of times. These reflective means may take the form of separate reflective surfaces independently positioned near opposing ends of the transparent body as shown for reflective surface 30 or they may take the form of coatings on the transparent body as shown in the case of reflective surface 32. If the reflective means take the form of reflective coatings or are in actual contact with the transparent body, they should either be composed of a dielectric material or have a transparent insulator between themselves and the conducting electrodes 28 and 29 to prevent shorting of the applied voltage between the conductive electrodes.

In accordance with this invention, reflective surfaces 30 and 32 are positioned in a special spatial relationship to increase cumulative deflection of the light beam. Reflective surface 30 is shown tilted at a positive angle with respect to reflective surface 32, which is substantially parallel to the side of deflector 20 to which it is adjacent, in order to establish a light reflection cavity for a light beam entering deflector 20 at an angle A with respect to a normal from reflective surface 32. The beam is reflected by successive reflections between reflective surfaces 30 and 32 in a descending path through the deflector and then in an ascending path through the deflector to finally emerge therefrom as shown. In order to establish the desired descending and ascending path through deflector 20, it is necessary to arrange the tilted position of the reflective surface 30 at an angle B with respect to the plane of reflective surface 32. Angle B is smaller than the previously defined angle A of the incident light beam. This relationship between angles A and B will be discussed further hereinbelow.

One possible circuit means for applying a variable electric field to the electrodes 28 and 29 is generally indicated as 34. When circuit means 34 is activated in accordance with the teachings of the Fleisher et al. patent, a suitable voltage is impressed between electrodes 28 and 29 to cause deflection of the light beam emerging from the deflector.

For purposes of illustration, a utilization means, such as screen 36, is included to display the normal position of the undeflected light beam. With the application of a suitable voltage by means of circuit 34, the beam is deflected, vertically for example, in accordance with the operational description of deflectors of this type in the Fleisher et al. patent as schematically indicated on screen 36. Of course, deflector 20 may be oriented between reflective surfaces 30 and 32 to provide deflection in a different plane or direction. For example, the deflector could be rotated 90° to provide horizontal deflection on screen 36.

Referring to FIGS. 2, 3 and 4 three different cases are schematically illustrated to show the different paths the light beam may take depending upon the relationship between A and B. The deflector medium is not shown for simplicity in these figures. The reflective means are indicated by the same numbers used in FIG. 1. FIG. 2 illustrates the case where $A/B$ is an even integer and the beam makes $N=A/B$ passes down into the deflector and N passes up out of the deflector. FIG. 3 illustrates the case where A/B is an odd integer and again the beam makes N passes into the deflector and N passes out. In FIG. 2 the final pass makes an angle of 90° with respect to reflective means 32 and in FIG. 3 the angle at reflective means 30 is 90°. FIG. 4 illustrates the case where $A/B$ is not an integer. In this case the beam begins to move upward in the deflector at the first surface it strikes with a negative angle of incidence measured with respect to a normal to said surface. As illustrated, this occurs at reflective means 32.

FIGS. 5, 6 and 7 form the basis for a mathematical comparison between the non-parallel reflective surface arrangement in accordance with this invention and the prior art.

FIG. 5 schematically illustrates an arrangement in accordance with this invention and similar to that shown in FIG. 2. A deflector medium of thickness T receives a light beam of width W at an incident angle A with respect to a normal to reflective surface 32. The medium is enclosed on two sides by reflective means 30 and 32 which are shown in the figure as reflective coatings which may be deposited directly on the sides of the medium after properly cutting it to provide the proper positioning of the reflective coatings. As illustrated, coating 30 is positioned at an angle B with respect to a plane parallel to the incident face which is less than incident angle A. As can be seen from the figure, the light beam passes down through the deflector medium in four reflected passes before beginning its upward return path, which in this case is superimposed on the downward path. For simplicity, only the top of the beam is shown after entering the deflector. Also, for simplicity, the electrodes are not shown in this figure or in FIGS. 6 and 7.

The total path length $L_A$ of the light beam in the deflector medium for the arrangement of FIG. 5 without regard for orientation of the optical axis is $$L_A = 2NT \quad (1)$$

where N is the number of passes across the material of thickness T. The factor of 2 comes from N passes down into the deflector medium and N passes up and out of the deflector medium.

Neglecting the change in thickness T due to angle B and the enlargement of beam width W for large values of A, the following relationship exists (A being restricted such that the top of the beam remains inside the deflection medium after the first reflection from reflective surface 30).

$$\operatorname{Tan} A = \frac{W}{2T} \text{ or } A = \tan^{-1} \frac{W}{2T} \quad (2)$$

The separation ($W_i$) of the tops of the $i$th beam (any given reflected beam) and the $i+1$st beam (the following reflection from the same surface) is given by $$W_i = \tfrac{1}{2} T \tan (A - iB) \quad (3)$$

Note that as $iB$ approaches A, the separation of the beams at the reflective surface becomes smaller, thereby allowing the beams to overlap in the deflector medium making several passes through the same portion of the medium, thus providing increased path length per unit volume.

The total distance S that the beam tops cover before the beam begins to move back up between the reflecting surfaces is $$S = \sum_{i_0}^{N} W = \sum_{0}^{N} \tfrac{1}{2} T \tan (A - iB) \quad (4)$$

When $A = iB$ the beam will be normal to reflective means 32. On the next pass it will begin to move upward between reflective means 30 and 32.

Referring now to FIG. 6, the Fleisher et al. arrangement is schematically illustrated. The deflector medium is partially enclosed on opposite sides by parallel reflective means 38 and 39. The deflector medium is of the same volume as that in FIG. 5 having a thickness T and a height S and is shown receiving a light beam of width W. However, as indicated in FIGURE 6, this arrangement allows only three passes of the light beam through the deflector medium as compared to the four downward passes provided by the arrangement of FIG. 5. Again, only the top of the light beam is shown after entering the deflector for simplicity.

In order to provide a better basis of comparison between this invention and the prior art, the comparison will be made between the arrangement of FIG. 5 and that of FIG. 7, which is basically that of FIG. 6 but modified to provide four passes of the beam through the same volume of deflector medium as used in the arrangement of FIGS. 5 and 6.

Referring to FIG. 7, the deflector medium of thickness T and height S is shown receiving a light beam of width W. Three inverters or prisms 40, 42 and 44 are positioned with respect to the deflector medium and the incident light beam to establish four passes of the beam through the medium so as to provide accumulative deflection. Again for simplicity, only the stop beam is shown after entering the deflector medium.

The total length $L_R$ that a beam of width W can traverse, without regard for orientation of the optical axis of the deflecting medium, in a material of dimensions T, S, and thickness W as shown for the arrangement of FIG. 7 is $$L_R = \frac{S}{W} T + \frac{T}{W} S = \frac{2TS}{W} \quad (5)$$

From Equations 1, 2 and 5, the following ratio is obtained $$\frac{L_A}{L_R} = \frac{2NTW}{2TS} = \frac{2NW}{T \sum_{0}^{N} \tan (A - iB)} \quad (6)$$

If N is large $$\sum_{i=0}^{N} \tan (A - iB) = \int_{0}^{N} \tan (A - nA) \, dn = \frac{N}{A} \log \cos A \quad (7)$$

Thus, using Equations 2 and 6 the following relationship may be written $$\frac{L_A}{L_R} = \frac{2A \tan A}{\log \cos A} \quad (8)$$

Equation 8 is plotted in FIG. 8 against the angle A, in degrees. This plot shows that the gain of the non-parallel arrangement in accordance with this invention over the prior art is at least a factor of four and increases somewhat with A. The gain will actually be more on the order of a factor of eight because of the difficulty in arranging all of the reflected paths in the arrangement of FIG. 7 normal to the maximum change in index of refraction.

The above comparison clearly shows that this invention provides the means for achieving greater path length in a given volume of deflector medium than has been obtained in the prior art. Therefore, increased cumulative deflection is obtained. Furthermore, this improvement is obtained with simplicity.

The embodiments of the invention in which an exclusive property or right is claimed are defined as follows:

1. In a light beam deflector of the type having a light transparent and field responsive deflecting body wherein said body is positioned between first and second planar reflective surfaces such that a light beam entering said body at an angle A with respect to a normal from said first planar reflective surface is passed through said body a plurality of times by reflection between said first and second planar reflective surfaces while applying a suitable field to said body for obtaining cumulative deflection of said beam, the improvement comprising:
    said reflective surfaces are positioned non-parallel with respect to one another, said first reflective surface is positioned in a predetermined plane with respect to the incident surface of said body and said second reflective surface is positioned at an angle B with respect to said first reflective surface, angle B being less than angle A, so that a light beam entering said body undergoes multiple reflections between said reflective means causing the beam to follow a descending and then ascending path through said body whereby additional cumulative deflection of the light beam exiting the deflecting body occurs.

2. The deflector of claim 1 wherein:
    said deflecting body is an electro-optic medium which is a composite of two distinct regions, each of said regions having an electric field dependent index of refraction.

3. The deflector of claim 2 wherein:
    said medium is composed of two electro-optic crystals positioned adjacent each other to form a body having a boundary with a first electro-optic crystal surface on one side thereof and a second electro-optic crystal surface on the other side thereof, each crystal having a different index of refraction, said indices of refraction changing in opposite directions upon application of an electric field;
    said light beam is incident said first electro-optic surface;
    said first reflective surface is positioned adjacent said first electro-optic surface, and
    said second reflective surface is positioned adjacent said second electro-optic surface.

4. The deflector of claim 3 wherein:
    said first reflective surface is substantially parallel to said first electro-optic surface, and
    said second reflective surface is positioned at an angle B with respect to said first electro-optic surface and said reflective surface.

5. The deflector of claim 4 wherein:
    said first and second planar reflective surfaces are coatings on said first and second electro-optic surfaces respectively.

References Cited

UNITED STATES PATENTS

| | | | |
|---|---|---|---|
| 3,295,912 | 1/1967 | Fleisher et al. | 350—150 |
| 3,360,324 | 12/1967 | Hora | 350—160 |
| 3,450,460 | 1/1969 | Brown | 350—160 X |

RONALD L. WIBERT, Primary Examiner

P. K. GODWIN, Assistant Examiner

U.S. Cl. X.R.

178—7.6; 350—150, 299